Sept. 20, 1960 B. OSTENDORF, JR 2,953,631

STATION SELECTOR AND CONTROL APPARATUS

Filed Dec. 31, 1957 5 Sheets-Sheet 1

INVENTOR
B. OSTENDORF, JR.
BY John E. Cassidy
ATTORNEY

Sept. 20, 1960 B. OSTENDORF, JR 2,953,631

STATION SELECTOR AND CONTROL APPARATUS

Filed Dec. 31, 1957 5 Sheets-Sheet 2

INVENTOR
B. OSTENDORF, JR.
BY John E. Cassidy
ATTORNEY

STATION SELECTOR AND CONTROL APPARATUS

Filed Dec. 31, 1957 5 Sheets-Sheet 3

INVENTOR
B. OSTENDORF, JR.
BY
John E. Cassidy
ATTORNEY

STATION SELECTOR AND CONTROL APPARATUS

Filed Dec. 31, 1957 5 Sheets-Sheet 4

INVENTOR
B. OSTENDORF, JR.
BY John E. Cassidy
ATTORNEY

STATION SELECTOR AND CONTROL APPARATUS

Filed Dec. 31, 1957 5 Sheets-Sheet 5

INVENTOR
B. OSTENDORF, JR.
BY
John E. Cassidy
ATTORNEY 2,953,631

STATION SELECTOR AND CONTROL APPARATUS

Bernard Ostendorf, Jr., Stamford, Conn., assignor to Bell Telephone Laboratories, Incorporated, New York, N.Y., a corporation of New York Filed Dec. 31, 1957, Ser. No. 706,463
11 Claims. (Cl. 178—2)

Figures 1, 6:
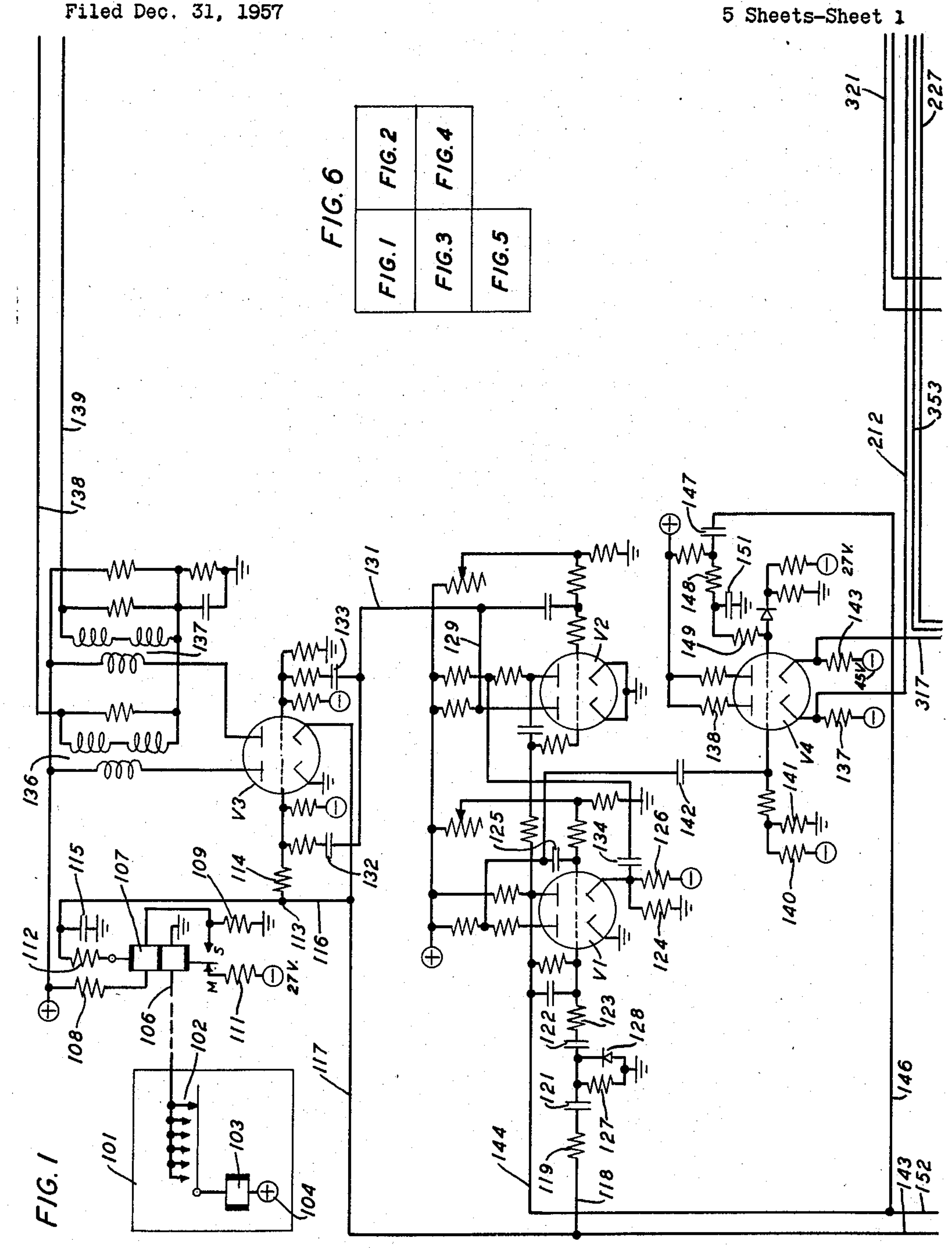

This invention relates to signal responsive selector mechanisms and particularly to instrumentalities for making selections under the conjoint control of two or more telegraph code combinations received in succession.

More especially, the invention relates to an electronic circuit arrangement for decoding and giving effect combinationally to two or more successively received telegraph signals.

An object of the invention is to perform selective operations under the control of at least two code combinations successively received and combinationally decoded in electrical circuits.

Another object of the invention is to register in electrical circuit arrangements an indication of reception of any one of a plurality of signal code combinations.

Another object of the invention is to prime or otherwise significantly condition one or more code combiner circuits in response to individual code combinations received.

A further object of the invention is to effectuate a selective operation by acting upon a primed or combined code combiner circuit in response to a code combination immediately following one that primed or conditioned the code combiner circuit.

Another object of the invention is to reset the indication circuits after a combiner circuit that has been primed by the indication circuit has been acted upon to effect a selective operation.

The invention features a gas-stepping tube decoding circuit having a fan-like arrangement of cathodes for advancing a discharge under the control of electronic character and element timing circuits to a particular ultimate cathode in combination with a plurality of transistor flip-flop storage circuits to permit the sequential selection of teletypewriter code signal combinations.

In addition, the invention features a resistance-capacitance combiner circuit arrangement individual to each storage circuit and having connection to the decoding circuit for registering reception of two successively transmitted code combinations and effecting station selection in response thereto.

The invention also features an electronic timing and pulsing circuit arrangement for restoring the storage selecting circuits to the unselected condition at the beginning of each two signal code combination.

Another feature of the invention is an electronic teletypewriter station control circuit for preventing activation of a monitor station in response to a valid code combination not intended for that monitor station, the first signal of a two character code combination, and certain teletypewriter apparatus control signals.

Patent 2,766,318 granted October 9, 1956 to W.M. Bacon, G. J. Knandel, J. A. Krecek and G. A. Locke discloses, as part of an automatic teletypewriter switching system, a multistation line having one or more station control circuits each arranged to connect a teletypewriter station in message receiving relation to the line in response to address codes each comprising two permutation code signal combinations. An electromechanical selector mechanism for making a station selection in response to the combined selective attributes of two or more received code combinations is disclosed generally in the Bacon et al. patent, and is disclosed in considerably greater detail in Patent 2,543,174, granted February 27, 1951 to G. G. Keyes and in Patent 2,568,264, granted September 18, 1951 to W. J. Zenner. This electromechanical selector mechanism includes a plurality of pairs of individually selectable elements, one element being normally blocked against selection by a blocking lever which the other element, upon selection, disables. Upon reception of a particular code combination all of the unblocked or primarily selectable elements that are coded to respond to that code combination are selected and moved to operated positions, in which they become latched. In the latched positions, the primarily selectable elements unblock their associated secondarily selectable elements. Any unblocked selectable element is then free to respond to its selective code combination, providing that code combination is next received, to close contacts or perform some other operation by which effect is given to the selection, such as the selection of a teletypewriter station. Following the selection of a secondarily selectable element, all of the operated primarily selectable elements are unlatched and restored to unoperated condition. The same signal may serve as the first code combination of certain address codes and as the second code combination of other address codes, so that in the same receiving cycle in which a secondarily selectable element is selected and operated one or more of the primarily selectable elements may also be selected and operated. Each address code comprising two code combinations is followed by a Letters signal, the primary purpose of which is to place a teletypewriter printer in the lower case or unshift condition, but which is also sometimes used as an idling signal to provide time for switching or other operations or to perform supplementary functions not inconsistent with its use as an unshift signal. The supplementary function that the Letters signal performs as it follows the two-character address code is the unlatching of the primarily selectable elements that operate and latch in the same receiving cycle and in response to the same code combination as a secondarily selectable element.

It is the purpose of the present invention to perform the functions of the electromechanical selector mechanism by an electrical circuit arrangement of circuit components particularly employing space discharge devices and semiconductor devices.

Briefly, the electrical system for making selections in response to two or more code combinations successively received includes a normally dormant oscillator that is held dormant under the control of a telegraph receiving relay associated with a telegraph line, the relay being held in a steady marking condition by the current that flows in the rest condition of the line. When the receiving relay responds to the start element of a telegraph code combination, it sets in operation the oscillator and also triggers monostable flip-flop circuit to its off-normal condition. The flip-flop circuit includes timing elements such that without external control it will return to its normal condition in an interval slightly longer than that of a received code combination. The frequency of the oscillator is such that each cycle has a duration equal to that of an element of correctly timed telegraph code signals. The flip-flop circuit, in the off-normal condition, is pulsed by the oscillator once in each cycle thereof, but the circuit constants of the flip-flop circuit prevents it from returning to normal condition until the oscillator circuit pulse associated with the last selecting code element of a received code combination occurs, at which instant the oscillator forces the return of the flip-flop circuit to normal condition, the oscillator being thereby stopped. The oscillator thus supplies the external control that restores the flip-flop circuit slightly ahead of the time at which its own circuit components would restore it.

Associated with the receiving relay is a pulsing circuit for separating received marking and spacing signal elements and for pulsing, under the control of the oscillator circuit, one or the other of two conductive paths, one of which is pulsed for marking elements and the other for spacing elements. The conductive paths that are pulsed selectively in accordance with the marking and spacing nature of received code elements are connected to discharge transferring cathodes of gas-filled stepping tubes according to the arrangement of apparatus and principle of operation disclosed in M. A. Townsend Patent 2,606,309, granted August 5, 1952. This patent discloses a gas-filled stepping tube in which there is directional selectivity in the stepping of a discharge from cathode to cathode in a fan circuit arrangement, whereby any one of a plurality of cathodes may be selected under the control of two types of code elements which may be designated as marking and spacing elements. The Townsend patent discloses a tube having eight final cathodes which is an arrangement that is feasible of manufacture. In accordance with the teaching of Townsend, a discharge may be transferred to any one of the eight final cathodes in three steps under the control of three code elements. In the arrangement according to the present invention, four such tubes are employed to provide a total of thirty-two final cathodes, which is the maximum number of selective possibilities of the five-unit permutation code. Each of the tubes include not three but five steps, the first two of which are non-directional, the fanning beginning at the third step. By properly connecting the transfer control cathodes to the marking and spacing pulsing leads, a discharge will appear at a different one of the thirty-two final cathodes for each code combination of the five-unit permutation code.

The transfer of a discharge to a selected final cathode of one of the tubes causes a voltage to be impressed upon a memory or indication circuit connected to that particular final cathode. Each of the memory or indication circuits is a bistable single transistor flip-flop circuit having the arrangement and mode of operation described in copending application Serial No. 292,875, filed June 11, 1952 by B. Ostendorf, Jr. which issued on April 22, 1958 as Patent No. 2,831,983.

The patents and application identified in the foregoing are hereby incorporated herein, by reference thereto, as though fully set forth herein.

Each of the indication or memory circuits has associated with it one or more combiner circuits, the number of those circuits associated with a single memory circuit, depending upon the number of selections that have the same first character. When a single transistor flip-flop circuit has been operated to the off-normal condition in recognition of reception of a character code, it causes the charging of a condenser in each of the combiner circuits connected to it. At the beginning of the next code combination received, the discharges are reset in the fan circuit gaseous stepping tubes, and upon the energization of a final cathode in response to the second code combination, a pulse is applied, to the condenser of each of the combiner circuits associated with the particular final cathode. In the case of a combiner circuit which has its condenser charged by the associated code storage circuit, the pulsing of the condenser in the combiner circuit will cause the activation of a station receiving circuit. The station receiving circuit is a two-condition circuit, and when activated, it renders an associated teletypewriter receiving printer or reperforator responsive to signals received by the receiving relay.

One or more of the station receiving circuits may be activated in the manner described above. When all of the address codes preceding a message have been decoded in this manner and the appropriate station receiving circuits activated, the signals for carriage return and line feed follow and are received ahead of the text of the message for the selected receiving stations. In response to the decoded line feed signal, an activate-deactivate circuit, which is a two-condition circuit, is operated to the deactivate condition, in which it imposes upon the station receiving circuits a condition preventing them from being activated in response to sequences of character codes that appear in the text of the message and are the same as address codes. At the end of the message, a disconnect signal comprising the codes for Figures, which is the upper case shift code, the opposite of the Letters signal, and an H signal operate through a memory circuit and associated combiner circuit to restore the activate-deactivate circuit to the activate condition, thereby rendering the station receiving circuits responsive to their appropriate two-character address code signals.

A further circuit that is controlled from the combiner circuits is one for recognizing non-valid address codes received by the receiving relay. Its purpose is to detect, when the activate circuit is in the activate condition, that a sequence of two-character codes received as if representing a station address code does not correspond to the address code of any station served by the particular multistation line. Upon detecting that condition, it will activate a particular one of the station receiving circuits to receive the message that follows immediately or after other address codes. This arrangement prevents a loss of message which has a garbled address code, because it causes the message to be recorded and preserved at one of the stations, thereby enabling tracing procedures to be instituted in order to determined the proper address. Were it not for this feature, a message might be lost entirely.

For a complete understanding of the invention, reference may be had to the following detailed description to be interpreted in light of the accompanying drawings, in which:

Figs. 1 to 5, inclusive, when arranged as shown in Fig. 6, show the complete circuits of an electronic system for selecting stations in response to address codes each comprising two-character code combinations.

The format of a message to be directed by the selector mechanism to a particular station is like that described in the copending application of Bacon et al. It comprises an address code for the station that is to be selected, which might be the two-character code BR, followed by a Letters signal which in turn is followed by the carriage return and line feed signals. It is the function of the Carriage Return and line feed signals to condition the teletypewriter recorder at the selective station for printing at the beginning of a new line on the teletypewriter stationery. The line feed signal is also employed for deactivating the selector mechanism so that it shall not select other stations in response to character code sequences occurring in the body of the message that correspond to call-directing or address codes. The line feed signal may also be followed by a Letters signal to afford a brief time interlude between the line feed signal and the beginning of the body of the message. Such interval is not needed in connection with the operation of an electronic selector mechanism, such as that which will be described herein, because the circuits and components provide an inertialess system that is extremely fast in operation. It has been the custom to provide the interval to accommodate the operation of slower mechanical selector mechanisms so that the deactivate or other function could be completed before other signals were received. More than one address code may precede the Carriage Return and line feed signals, each being followed by a Letters signal to set off the call-directing codes from one another. The body of the message, including perhaps the identification of the called station as well as the calling station in full text, follows the line feed signals or the Letters signal accompanying the line feed signal. At the conclusion of the message, the disconnect signal, comprising the codes for Figures H and Letters, terminates the message.

In the description which is to follow, the circuit components in the several figures of the drawings are identified by three-digit reference numerals, the first digit of which identifies the figure of the drawings in which the component appears, and the other two digits distinguish among the components in each figure of the drawings. An exception to this rule is the case of certain conductive paths which extend from one sheet of drawings to another. A conductive path carries the same reference numeral from its point of beginning to its terminus or to a junction with one or more other conductors.

In the following description where values of constants are cited, it is to be understood that it is by way of example to facilitate understanding the invention.

Referring now to Fig. 1 of the drawings, the reference numeral 101 designates a telegraph station which is a point of origin or transfer for messages to be switched through the switching apparatus embodying the present invention to one or more receiving stations. In a switching system such as that shown in the Bacon et al. application, station 101 may be a switching center where messages received from various telegraph stations over lines or trunks are relayed to selected outgoing channels for retransmission toward ultimate destinations. For the purpose of simplicity, station 101 has been shown merely as a message source comprising a telegraph transmitter 102 of conventional type associated with a teletypewriter recorder for producing a home record or monitor copy of message material transmitted, the teletypewriter being represented symbolically by selector magnet 103. A positive battery connection 104 for supplying transmission current is provided at station 101 and the station is connected by transmission channel 106 to the input of the selector mechanism, the input being receiving relay 107 which has line conductor 106 connected to one terminal of its lower winding and the other terminal connected to ground. Current flowing through the lower winding during the idle condition, when no messages are being transmitted, causes the armature of relay 107 to engage its marking contact M. Relay 107 is a polarized relay and has its upper or biasing winding included in a conductive path from positive battery through resistor 108, the upper winding of the relay, and resistor 109 to ground. Spacing contact S is connected to the top terminal of resistor 109. When the transmitter 102 at station 101 interrupts the current through the lower or operating winding of relay 107, current in the circuit just traced operates the armature of the relay to its spacing contact. The marking contact of relay 107 is connected through resistor 111 to a potential difference source that is negative at 27 volts with respect to ground. All positive battery indications represent a voltage of 260 volts relative to ground and all negative battery terminations not otherwise identified herein represent battery connections at 160 volts negative with respect to ground.

Resistors 108 and 109 are of such magnitude that the spacing contact S is at a potential of approximately 70 volts positive with respect to ground. The armature of relay 107 is connected through a resistor 112 to a junction point 113 to which is connected to the cathode of the right-hand triode section of electron discharge tube V3, which is preferably a vacuum tube. From the junction point 113 there is also a connection through resistor 114 to the grid of the left-hand triode of tube V3. Both triode sections of tube V3 are biased substantially to cut-off by virtue of negative battery connections to the grids. The left-hand cathode of tube V3 is grounded and the right-hand triode has negative 27 volts in the marking condition of relay 107 and positive 70 volts in the spacing condition. It follows from this that the negative bias on the left-hand triode is reduced when relay 107 operates to spacing because the grid of the left-hand triode swings towards positive, whereas the negative bias on the right-hand triode is increased with relay 107 in the spacing condition because the right-hand cathode swings toward positive. The bias on both triodes of tube V3 is such that neither triode is conductive in the idle condition of the circuit, with the relay armature on its marking contact, but the right-hand triode is at a lesser negative bias than is the left-hand triode. Moreover, the bias on the grids of tube V3 is such that when the armature of relay 107 operates to spacing, the reduction in negative bias on the left-hand triode of tube V3 is not sufficient to render that triode conductive. Resistor 112 connected between the armature of the relay and junction 113, and capacitor 115 connected from resistor 112 to ground, serve as a filter to prevent the occurrence of voltage fluctuations at junction 113 due to bouncing of the armature of the relay, since the application of multiple pulses from the junction point 113 to the left-hand grid and right-hand cathode of tube V3 might produce spurious pulses in the output of the tube.

The positive potential that is applied to junction 113 when relay 107 goes to spacing is extended over conductors 116, 117 and 118, resistor 119, capacitors 121 and 122, and resistor 123 to the grid of the left-hand triode of double-triode tube V1. Tube V1 is a monostable flip-flop circuit and its purpose is to time a received code combination. Its normal condition, prior to the response of relay 107 to the start element of a code combination, is that the left-hand triode is cut off and the right-hand triode is conducting. In this normal condition, with the right-hand triode conducting, a negative potential of the cathode of the right-hand triode applied through the potential divider comprising resistors 124 and 126 connected between negative battery and ground holds the right-hand anode at negative potential and this potential is applied to the grid of the left-hand triode of tube V2, holding that triode cut off. Tube V2 is a free-running multivibrator which has symmetrical half cycles and provides a timing wave, each cycle of which has a duration equal to correctly timed start and selecting elements of code combinations.

When a positive pulse is applied to the grid of the left-hand triode of tube V1 over a previously traced path as relay 107 responds to the start element of a code combination, that triode is rendered conductive, and due to the flip-flop connection including capacitor 125 with the grid of the right-hand triode the latter triode cuts off. The right-hand anode of tube V1 swings positive and holds the left-hand triode conductive through a clamping connection to the grid of the latter triode for the interval in which the right-hand triode remains cut off. Resistor 127 and varistor 128 connected from the junction of capacitors 121 and 122 to ground by-passes the negative pulses resulting from return of the armature of relay 107 to the marking contact so that the left-hand triode of tube V1 is not influenced by that return. The constants of the elements of the timing circuit comprising capacitor 125 and resistors associated with the grid of the right-hand triode of tube V1, which circuit times the interval for self-restoration of tube V1 to its normal condition, have such values that this interval is slightly longer than five and one-half elements of correctly timed signals, thereby bringing the time of self-restoration into the interval between the middle of the fifth selecting code element and the beginning of the stop element. An external influence from the free-running multivibrator comprising tube V2 accelerates the time of restoration of tube V1 as will be described hereinafter.

With tube V1 in its off-normal condition, the right-hand anode of the tube is positive and this potential is impressed upon the left-hand grid of tube V2, permitting that tube to operate as a multivibrator. The left-hand triode conducts in the first half of a received start element, and the right-hand triode conducts during the last half of the start element and each received significant element. It follows from this that the left-hand anode swings negative at the beginning of the start element and at the beginning of each selecting element, and swings toward positive at the middle of the start element and the middle of each selecting element. The left-hand anode of multivibrator tube V2 is connected through conductors 129 and 131 and branching paths to the grids of tube V3, each of the branching paths including a blocking condenser, these condensers being designated by the reference numerals 132 and 133. The positive swing is sufficient to render one or the other of the triodes of tube V3 conductive momentarily, depending upon the position of the armature of relay 107 at the time of occurrence of the pulse. If the armature is on the marking contact, biasing the left-hand triode more negative than the right-hand triode, the latter triode will conduct momentarily. On the contrary, if the armature engages the spacing contact, biasing the right-hand triode more negative than the left-hand triode, the latter triode will conduct momentarily.

The external control for accurately timing the restoration of tube V1 to normal condition is derived from the right-hand anode of tube V2 and is supplied through capacitor 134 to the right-hand cathode of tube V1. While tube V2 is operating as a free-running multivibrator, a negative charge on capacitor 125, through which the right-hand triode of tube V1 was cut off, is leaking off and the right-hand grid of tube V1 is rising toward positive. Since the left-hand anode of tube V2 swings toward negative at the beginning of each code element and swings toward positive at the middle of each code element, it follows that the right-hand anode of tube V2 does just the opposite, swinging toward positive at the beginning of each code element and toward negative at the middle of each code element. These voltage swings are applied through capacitor 134 to the right-hand cathode of tube V1. The positive swings merely increase the negative grid-to-cathode bias on the right-hand triode of tube V1. The negative swings, being swings toward the potential of the grid, reduce the bias on the right-hand triode of tube V1. When the negative cathode swing occurring at the middle of the fourth code element occurs, capacitor 125 has not lost enough of its negative charge to permit the cathode swing to render the right-hand triode of tube V1 conductive. However, at the next negative swing of the cathode, which occurs at the middle of the fifth code element, the right-hand grid of tube V1 has risen toward positive sufficiently that the negative cathode swing will render the right-hand triode of tube V1 conductive. The right-hand anode of tube V1 swings toward negative, cutting off the left-hand triode and holding it cut off until the next positive pulse is applied through capacitors 121 and 122. This pulse should occur at the start transition of the next received code combination, because relay 107 returns to marking for the stop and rest condition following the fifth code element, applying a negative pulse to capacitor 121 as the armature of the relay returns to marking. With the monostable flip-flop circuit comprising tube V1 in its normal condition, the operation of the free-running multivibrator is suspended and that multivibrator remains in its rest condition with the right-hand triode conductive and the left-hand triode cut off.

It was previously stated that the grids of tube V3 are pulsed positively at the middle of each received code element, the right-hand triode conducting momentarily when a marking condition is being received and the left-hand triode conducting momentarily when a spacing condition is being received. The external anode circuit of the left-hand triode of tube V3 includes the primary winding of a transformer 136, and the external anode circuit of the right-hand triode of the tube includes the primary winding of a transformer 137. The secondary winding of transformer 136 is shunted by a resistor and is connected between ground and an output conductor 138. Similarly, the secondary winding of transformer 137 is shunted by a resistor and is connected to output conductor 139. A control pulse is impressed on conductor 139 at the middle of each marking code element by transformer 137 and a control pulse is impressed upon conductor 138 by transformer 136 at the middle of each spacing code element.

Figure 2:
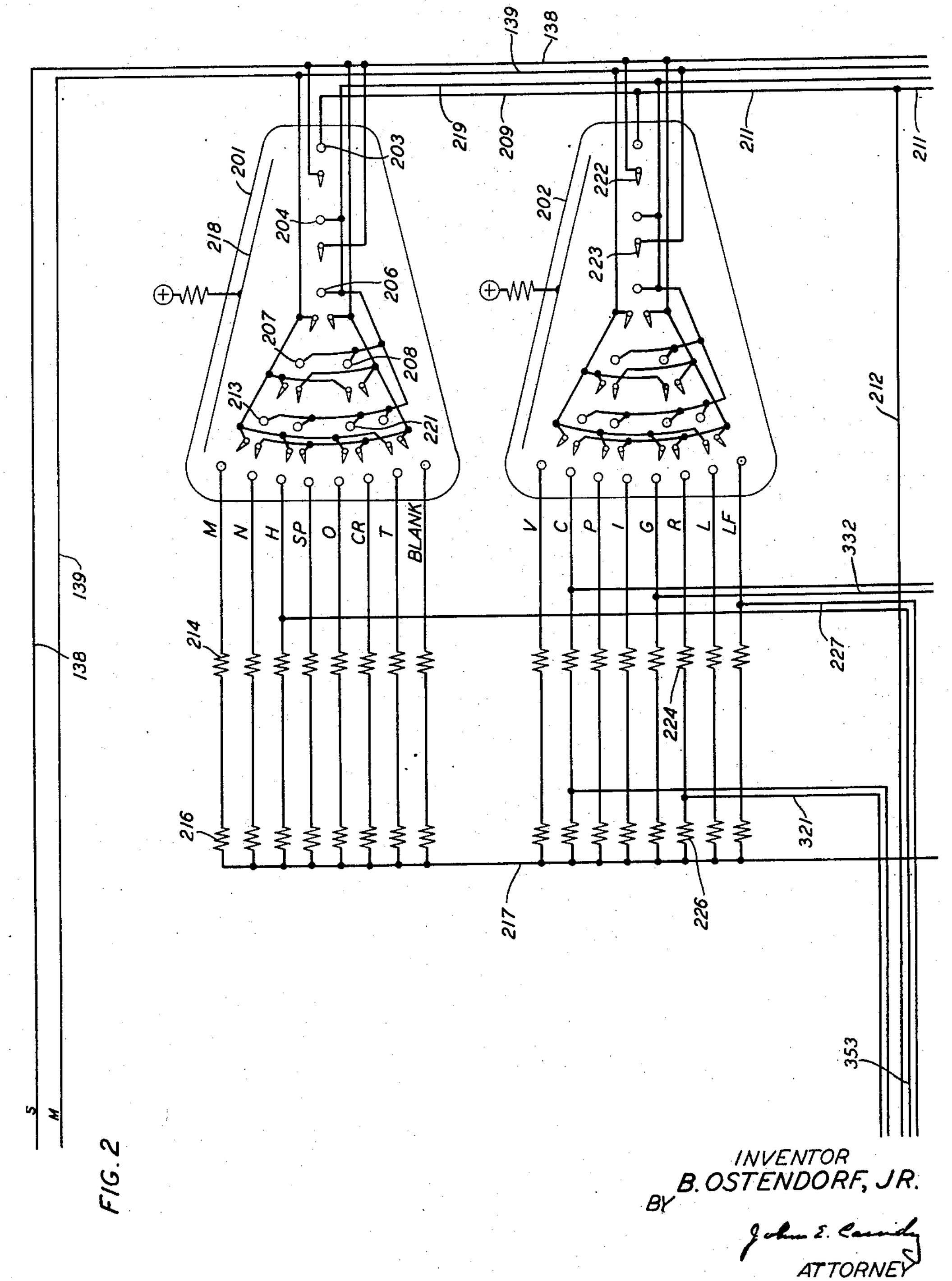
Figure 4:
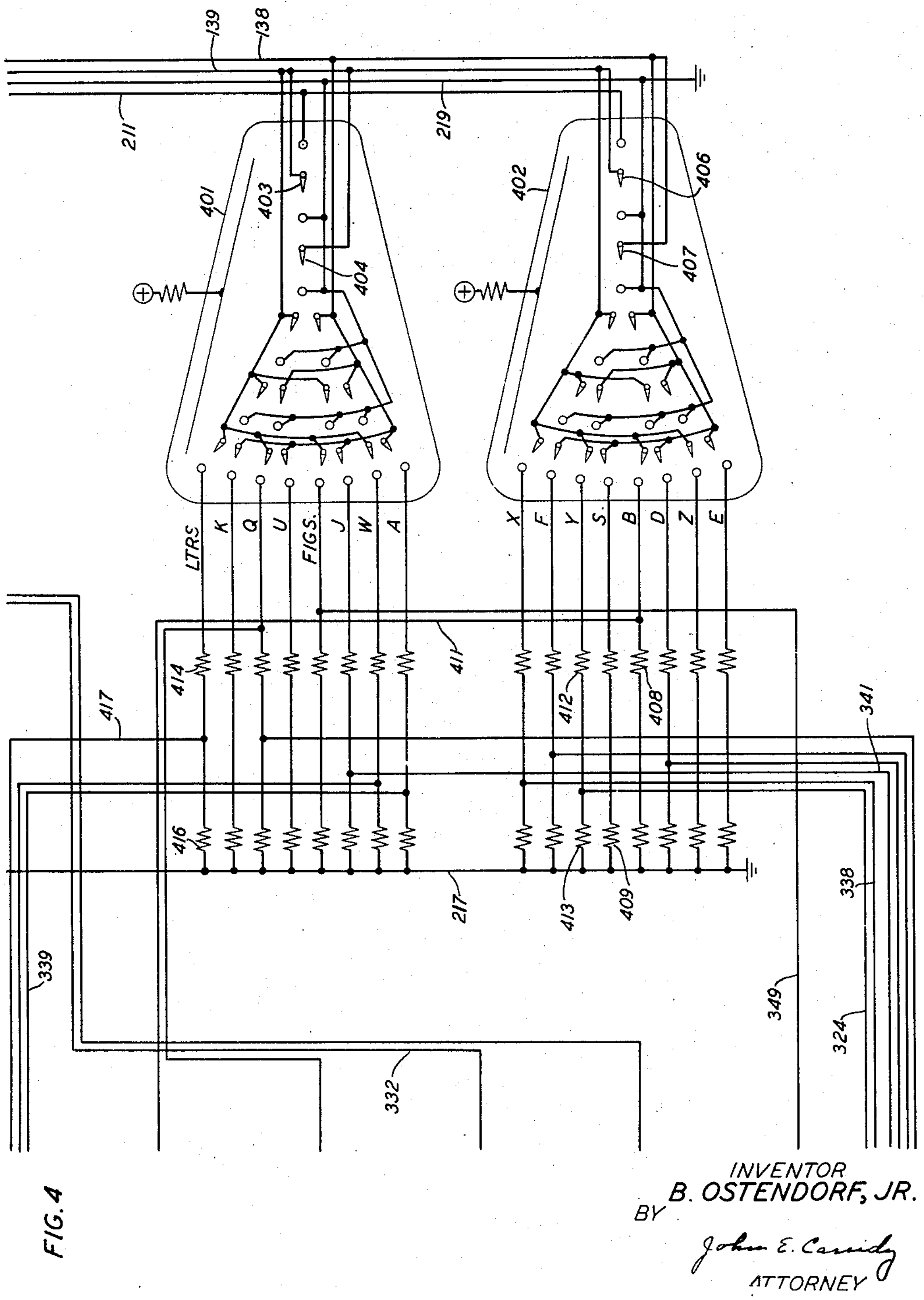
Figure 5:
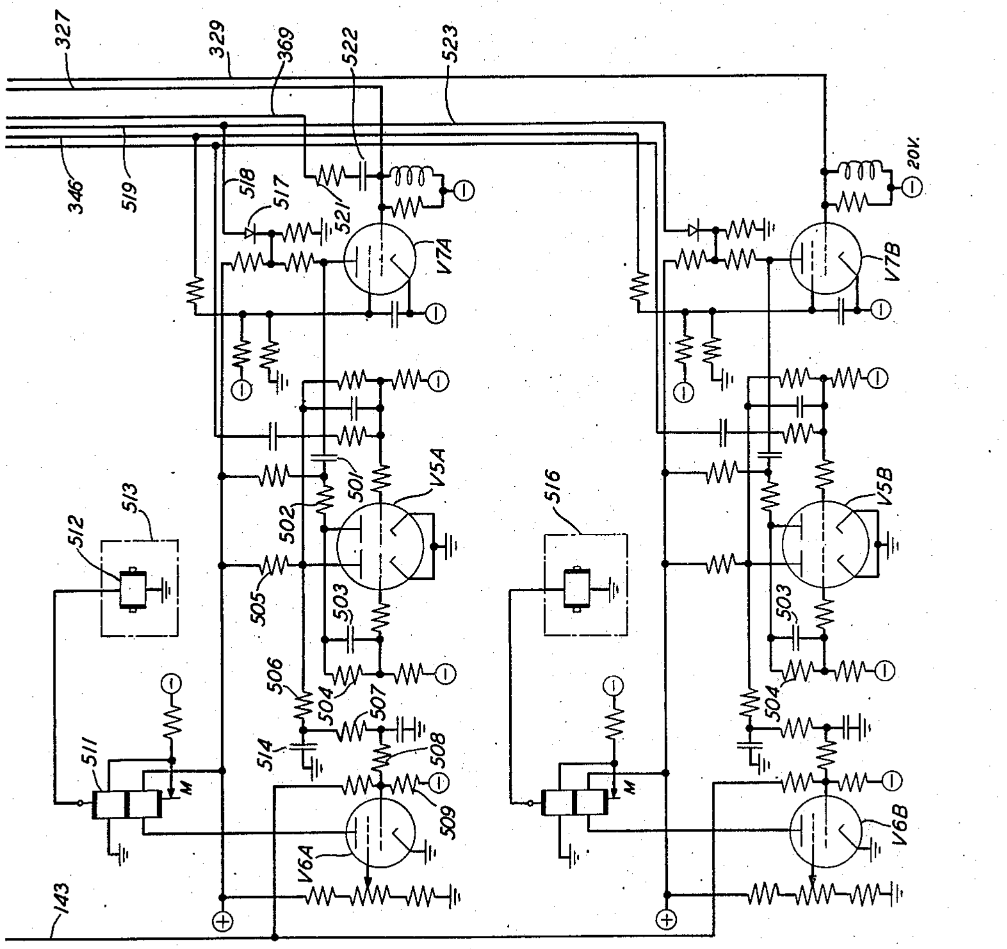

In Figs. 2 and 4 are shown four gas-filled stepping tubes designated by the reference numerals 201, 202, 401, and 402. Each of these tubes contains an anode and two different types of cathodes usually designated as the A and B cathodes, the A cathodes being represented by small circles and the B cathodes being represented by triangles, each pointing toward an individual one of the A cathodes. The A cathodes are all returned to a point at or near ground, and the B cathodes are connected selectively to the marking and spacing control conductors 139 and 138. The A cathodes are rest cathodes, and a steady state discharge will exist between any one of the A cathodes and the anode. The B cathodes are transfer cathodes, and will transfer a discharge from one A cathode to another in one direction only, which is the reason that the tube is called a stepping tube. The cathode at the point of beginning of the stepping path is called a reset cathode, and the pulsing of that cathode will cause the transfer of a discharge to it from any other cathode in the tube that is then conducting a discharge.

Referring now specifically to Fig. 2, the reset cathode in tube 201 is designated by the reference numeral 203. Immediately to the left of reset cathode 203 is a B cathode which, when pulsed, will cause the discharge to transfer from reset cathode 203 to A cathode 204. To the left of this cathode is another B cathode which, upon being pulsed, will cause the discharge to transfer to A cathode 206. To the left of the latter cathode is a pair of B cathodes, and the pulsing of one of these will cause the selective transfer of the discharge to either of the A cathodes 207 or 208. To the left of each of the cathodes 207 and 208 is a pair of B cathodes, and the pulsing of any one of these will cause the selective transfer of the discharge to any one of four A cathodes. Similarly, there is a pair of B cathodes to the left of each of the four A cathodes, and the selective pulsing of any one of these will cause the transfer of the discharge to any one of eight final cathodes.

Reset cathode 203 is connected by conductors 209, 211 and 212 to the cathode of the left-hand triode of tube V4 in Fig. 1. This triode has its cathode returned to negative battery through resistor 137, which is the output load resistor for the triode, its anode having no other connection than to positive battery through resistor 138 and its grid being biased negatively by a potential divider comprising resistors 140 and 141 connected between negative battery and ground. A pulsing connection from the anode of the left-hand triode of character timer flip-flop tube V1 to the left-hand grid of tube V4 includes capacitor 142. When the left-hand triode of flip-flop tube V1 is rendered conductive at the beginning of the start element of a code combination and its anode swings toward negative, a negative pulse is impressed through capacitor 142 to the left-hand grid of tube V4, reducing the conductivity of this triode. Because the output is taken from the cathode, which follows the potential of the grid, a negative pulse is applied over conductor 212 to reset cathode 203 to transfer the discharge to that cathode. The negative charge on capacitor 142 leaks off and restores the left-hand triode of tube V4 to normal conductivity near the end of the received start element, thereby maintaining the left-hand triode of tube V4 at reduced conductivity during almost the entire received start element. With a negative potential impressed on the reset cathode for this interval, the pulsing of an adjacent B cathode during the interval will not result in the transfer of a discharge from the reset cathode. It will be noted that the B cathode immediately to the left of the reset cathode 203 is connected to spacing conductor 138 which is pulsed about the middle of the received start element. This pulsing of the B cathode does not result in the transfer of the discharge to A cathode 204 because the cathode cannot effect a transfer until the reset cathode has returned to its normal potential near ground. The reset cathodes in the other three tubes are also connected to conductor 212, so that the discharge is reset in the tubes during the reception of the start element and is prevented from being stepped during that element.

The first B or transfer cathode in tube 201 is connected to spacing pulse conductor 138, as is also the second B cathode. It follows from this that the first spacing element received after the start element will cause the transfer of a discharge from reset cathode 203 to rest cathode 204, and the next spacing element will cause another transfer to rest cathode 206. From that point on, the transfer cathodes appear in pairs, doubling in number for each step, and comprising one, two and four pairs. The upper transfer cathode of each pair is connected to the marking pulse conductor 139, and the lower one is connected to the spacing pulse conductor 138. A marking pulse occurring on conductor 139 when the discharge is at rest cathode 206 will cause the discharge to transfer to rest cathode 207, whereas a spacing pulse will cause it to transfer to rest cathode 208. By similar selective transfer in the next two ranks of transfer cathodes, the discharge may be brought to any one of eight final rest cathodes.

The eight final rest cathodes have been designated by the character or function signals to which they correspond. For example, should the received signal comprise two spacing elements followed by three marking elements, the discharge will be reset to cathode 203 during the start element, will be transferred to rest cathode 204 during the first spacing element, to rest cathode 206 during the second spacing element, to rest cathode 207 during the first marking element, which is the third element of the code combination, to rest cathode 213 during the second marking element, which is the fourth element of the code combination, and to final cathode M during the third marking element, which is the fifth element of the code combination. The final cathode M is connected through resistors 214 and 216 to ground conductor 217, and the discharge current flows from ground through those resistors and from final cathode M to anode 218, which is common to all of the cathodes of the tube. All rest cathodes in tube 201 other than the final cathodes are connected to conductor 219 which is grounded. If the code combination for Carriage Return, which consists of the code elements space, space, space, mark, space, should be received, the discharge will transfer from reset cathode 203 to rest cathode 204 in response to the first spacing element, to rest cathode 206 in response to the second spacing element, to rest cathode 208 in response to the third spacing element, to rest cathode 221 in response to the first marking element, and to rest cathode CR in response to the final spacing element.

Consideration will now be given to the response of tube 201 to a signal which does not have its first two code elements of spacing nature. It will be supposed that the signal for the character W, which is comprised of the elements mark, mark, space, space, mark, is received. Since the transfer of the discharge from reset cathode 203 occurs only in response to spacing elements in tube 201, the discharge will remain on reset cathode 203 during the first two elements of the code combination for W. In response to the third element, which is of spacing nature, the discharge will transfer to rest cathode 204, and during the fourth code element, which is also of spacing nature, the discharge will transfer to rest cathode 206. During the final code element, which is of marking nature, the discharge will transfer to rest cathode 207. Since the code combination contains no more code elements, the discharge will not advance beyond this point, but will be reset during the start element of the next received code combination. Thus the discharge will reach one of the final cathodes in tube 201 only in response to code combinations corresponding to one of the eight characters or functions by which those eight final cathodes are identified. These are the code combinations which have the first and second elements of spacing nature.

Tube 202 has its first transfer cathode 222 connected to spacing pulse conductor 138, and its second transfer cathode 223 connected to marking pulse conductor 139. The remaining transfer cathodes are connected to conductors 138 and 139 in the same manner as those of tube 201, and tube 202 provides selective response for those eight code combinations which have the first element of spacing nature and the second element of marking nature. Similarly, tube 401 is effectively responsive to the eight code combinations having the first and second elements of marking nature, by having first and second transfer cathodes 403 and 404 connected to marking pulse conductor 139, and tube 402 is effectively responsive to the eight code combinations having the first element of marking nature and the second element of spacing nature, by having the first transfer cathode 406 connected to marking pulse conductor 139 and the second transfer cathode 407 connected to spacing pulse conductor 138.

As previously stated, the selector mechanism being described herein effectuates selections in response to call-directing codes comprising two characters. In order to do this, it is necessary to register and store an indication of reception of any code combination in order to produce a combinational result from two successively received code combinations. The instrumentality used for registering the reception of code combinations is a single transistor flip-flop circuit shown in Fig. 3. This circuit is fully described and claimed in copending application Serial No. 292,875, filed June 11, 1952 by B. Ostendorf, Jr., hereinbefore identified and the disclosure of that application is incorporated herein by reference as if fully disclosed in the present specification. It will be described in the present specification only to the extent necessary to convey an understanding of its operation for the purposes of the present invention.

It will be assumed that a message is transmitted from station 101, preceded by the address code BR. The code combination for the character B has its first code element of marking nature and its second code element of spacing nature, and the code combination is effectively decoded by stepping tube 402 to establish a discharge at final rest cathode B and a resulting flow of current through resistors 408 and 409. The establishment of a discharge through final rest cathode B results in a swing of that cathode toward positive, and the swing is impressed over conductor 411 on the right-hand terminal of capacitor 301. The other terminal of capacitor 301 is connected through resistor 302 to the base 303 of transistor 304, and the base is also connected through resistor 306 to ground.

The collector 307 of transistor 304 is connected through resistor 308 to a negative potential source. The resistor 308 is of relatively low resistance, perhaps of the order of 820 ohms, and the battery connection serves to bias the collector in the reverse direction and is perhaps of the order of 26 volts.

The emitter electrode 309 is returned to negative potential through the load line resistor 311 which is large in comparison with the internal emitter resistance of the transmitter, and in one embodiment of the invention has a value of 3 megohms. The negative voltage to which the emitter is returned through resistor 311 is the full negative battery potential of 160 volts. The emitter also has connection through self-biasing resistor 312 to base 303, through capacitor 313 to ground, and through the crystal diode or varistor 314, and conductors 316 and 317 to the cathode of the right-hand triode of tube V4 which is connected through resistor 143 to negative battery supply at 45 volts. In the steady-state condition of the right-hand triode of tube V4, the tube is sufficiently conductive to provide a potential of approximately 11½ volts negative at the cathode, and this is the potential applied to the right-hand terminal of varistor 314.

With the circuit arrangement of the transistor as described, the transistor is normally held cut off by a small negative bias current flowing through resistor 311 from the negative battery supply. At the time of the positive voltage swing applied to conductor 411 by the final rest cathode B, a positive pulse is applied through capacitor 301 to the transistor base 303. This pulse effects no change in the steady-state condition of the transistor. During the start element of the next received signal combination, the discharge is reset in the stepping tubes 201, 202, 401 and 402. The final cathode B returns to ground potential, applying a negative-going pulse through capacitor 301 to transistor base 303. The negative transition applied to the transistor base causes the emitter 309 to be momentarily more positive than the base and hence positive current flows from the base to the collector. Feedback action obtained because of resistor 306 to ground causes an even more negative excursion of the base, and the emitter is pulled negatively along with the base because of the low internal emitter-to-base resistance. Upon reaching the holding potential of approximately negative 11.5 volts applied over conductor 316, the varistor 314 becomes a low impedance source of current supplying a high value of emitter current, which in turn sustains a high collector current. When the circuit has stabilized in the new condition, the collector-to-ground voltage is about negative 14 volts, an increase in potential of approximately 12 volts. The transistor is stable in this new condition, which is its off-normal condition.

The collector electrode 307 of the transistor is connected through resistor 318 to one terminal of a capacitor 319, the other terminal of which is connected over conductor 321 to the junction of resistors 224 and 226 connected between the final cathode R of stepping tube 202 and grounded conductor 217. The same transistor collector electrode is also connected through resistor 322 to one terminal of capacitor 323, the other terminal of which is connected over conductor 324 to the junction of resistors 412 and 413 connected in series between final cathode Y of stepping tube 402 and grounded conductor 217. The circuit comprising resistor 318 and capacitor 319 is a combiner circuit which is primed by transistor 304 in preparation for possible reception and decoding of the code combination for the character R. Similarly, the circuit comprising resistor 322 and capacitor 323 is a combiner circuit that is primed by the same transistor 304 in anticipation of possible reception of the code combination for the character Y. In the off-normal stable condition, collector electrode 307 of the transistor is more positive than it is in the normal stable condition, and the increased potential causes a charging current to flow through resistors 318 and 322 to charge capacitors 319 and 323, respectively.

When the code combination for the character R has been decoded by tube 202, a discharge is established between final cathode R and the anode of tube 202 to produce a positive voltage swing at the junction of resistors 224 and 226. The positive voltage swing, occurring about the middle of the fifth element of the code combination, is impressed on capacitor 319 and is in additive relation to the charge already impressed thereon by transistor 304. The resultant pulse, applied through crystal diode 326 and conductor 327 to the control grid of tube V7A renders that tube conductive for the duration of the pulse. The positive screen voltage for tube V7A is removable under circumstances to be described hereinafter, but it will be assumed for the present that the tube has proper screen voltage and that the positive pulse on its control grid will render it conductive. The anode of tube V7A is coupled through capacitor 501, resistor 502, which is part of the anode load of the right-hand triode of tube V5A, and capacitor 503, shunted by resistor 504, to the left-hand grid of tube V5A. This tube has circuit connections establishing a bistable flip-flop circuit, and it may be assumed to be conductive in its left-hand triode at this time, holding the control grid of tube V6A sufficiently negative that the latter tube is insensitive to positive potential applied from conductor 117 over conductor 143 to the control grid of tube V6A each time the armature of receiving relay 107 operates to spacing. The negative swing of the anode of tube V7A, as it becomes conductive, cuts off the left-hand triode of tube V5A, which renders the right-hand triode conductive. With the left-hand triode of tube V5A cut off, the anode of the tube swings toward positive, thereby raising the potential of the control grid of tube V6A through a potential divider circuit comprising resistors 505, 506, 507, 508 and 509. The resulting potential on the control grid of tube V6A brings it close to the threshold of conductivity, but the tube is not rendered conductive under the control of the left-hand triode of tube V5A alone. The anode circuit of tube V6A, in which no current is flowing, includes the operating winding of a repeating relay 511 which has its armature held in engagement with the marking contact by current through the biasing winding. A circuit through the armature and marking contact of repeating relay 511 includes the selector magnet 512 of a receiving teletypewriter station 513, which is the station designated by the address code BR. When current flows in the anode circuit of tube V6A, the armature of relay 511 moves out of engagement with the marking contact, impressing a spacing element upon the selector magnet 512.

The code combination for the letter R, in common with fifteen other code combinations of the five-unit code, has its fifth code element of spacing nature. Since tube V7A is rendered conductive momentarily, about the middle of that element, the armature of receiving relay 107 is engaging its spacing contact, applying positive battery over conductor 143 to the grid of tube V6A. Since this is the final code element of a code combination, it would be undesirable to permit receiving teletypewriter 513 to respond to that code element, which it would interpret as the start element of a code combination. The removal of the negative holding bias on the control grid of tube V6A is delayed by capacitor 514 connected to the junction of resistor 506 and 507, the delay extending well into the time of reception of the stop element following the final code element. When the negative holding potential is removed from the grid of tube V6A, the selector magnet 512 of teletypewriter 513 will respond to all signals received by receiving relay 107.

As previously stated, the character timer tube V1 is restored to its initial condition at the time of generation of the discharge stepping pulse for the fifth element of a code combination. The return of tube V1 to normal condition involves restoration of conductivity in the right-hand triode and cutting off of the left-hand triode. As conductivity is restored in the the right-hand triode, the anode of that triode swings toward negative and the negative swing is applied over conductors 144 and 146, capacitor 147 and resistors 148 and 149 to the grid of the right-hand triode section of tube V4. The function of this triode is to reset any transistor flip-flop circuit that was triggered to its off-normal condition at the end of reception of the preceding code combination, or additionally to turn off all flip-flops which might be off-normal after power is first turned on but before signals are received from the line. The negative swing of the right-hand anode of tube V1 produces a negative swing of the right-hand grid of tube V4 reducing conductivity of that triode. As previously stated, the cathode of the right-hand triode of tube V4 is connected over conductors 317 and 316 and through crystal diode 314 to the emitter electrode 309 of transistor 304. The emitter electrodes of all others of the transistors are connected through individual crystal diodes to conductor 316. Since the right-hand cathode of tube V4 follows the grid toward negative, the emitter of any transistor flip-flop circuit that is off-normal will be driven toward negative to restore the flip-flop circuit to its normal condition. A capacitor 151 is coupled from the junction of resistors 148 and 149 to ground, and its function is to delay slightly the negative-going transition of the grid and cathode of the right-hand triode of tube V4. It should be remembered that the restoration of tube V1 to normal condition occurs substantially at the same instant that the transfer of the discharge in one of the stepping tubes to a final cathode occurs. Referring specifically to the case under consideration, the transfer of the discharge to the final cathode R of tube 202 and the pulsing of capacitor 319, charged by transistor 304, would occur substantially at that instant. If the restoration of the transistor flip-flop circuit to normal condition were to occur at the same insant, capacitor 319 might discharge to a sufficient extent that the pulse applied over conductor 321 would be insufficient to activate tube V7A and trigger tube V5A. By restoring an off-normal transistor flip-flop circuit after the associated capacitor has been pulsed, the charge on the capacitor will not be lost.

It will also be remembered that the triggering of a transistor flip-flop circuit in response to a received code combination does not occur at the time of transfer of the discharge to the final cathode representing that code combination, at substantially the midpoint of the last code element of the code combination, but occurs instead at the resetting of the discharge in the stepping tube during the start element of the next received code combination. Thus the sequence of events, when the last cade element of a code combination has been identified, is to pulse the capacitor of a combiner circuit associated with a transistor flip-flop circuit that was triggered during the stat element of that code combination as a result of a selection made in response to the preceding code combination, then to restore that transistor flip-flop circuit, and in the start element of the next code combination to trigger the transistor flip-flop circuit representing the code combination just completed.

It will be noted with reference to Fig. 2 that there is no connection from the final cathode R of tube 202 to a single transistor flip-flop circuit. The significance of this is that among the teletypewriter stations controlled by the decoding circuits contained in Figs. 2 and 4, there is none having the letter R as the first character of its address code. If there were a station so designated, a single transistor flip-flop circuit would be connected to the final cathode R, and that trigger circuit would be triggered off-normal upon the resetting of the discharge in tube 202 during the start element of the code combina-following the address code BR, which is a Letters code combination. That single transistor flip-flop circuit would be restored to normal after the middle of the last selecting element of the Letters signal. Thus the Letters signal is not used as the first character of any two-character code so that there is no connection from the final cathode representing the Letters signal to a single transistor flip-flop circuit. From this it follows that at the end of the Letters signal none of the single transistor flip-flop circuits is off-normal.

Figure 3:
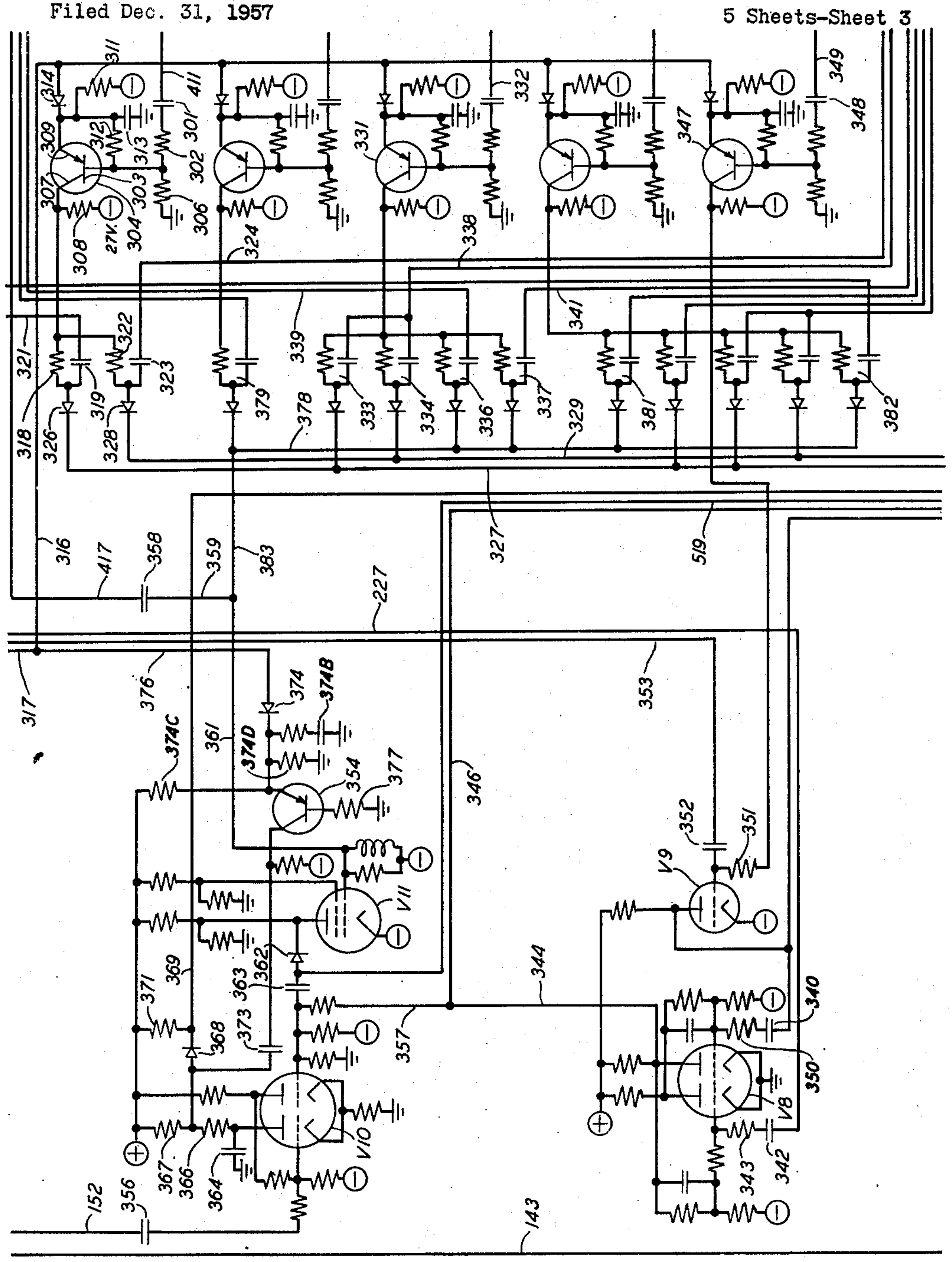

If a message is addressed to more than one station served by the same station selector unit or circuit, the address codes for the stations addressed, each comprising a two-character address code followed by the Letters signal, will be received by relay 107. For example, the address code BY might be received. The transistor flip-flop circuit 304 will be triggered off-normal in response to the character B to prime the combiner circuit comprising resistor 322 and capacitor 323, and the capacitor will be pulsed in response to the signal representing the character Y, delivering a pulse through crystal diode 328 and over conductor 329 to activate momentarily the tube V7B which, along with the bi-stable flip-flop circuit comprising tube V5B, followed by controlling tube V6B, renders teletypewriter station 516 responsive to signals. The address codes might include a group code, such as code GX. A flip-flop circuit including transistor 331 is arranged to be triggered off-normal over conductor 332 which is connected to final cathode G in tube 202. In Fig. 3, the transistor 331 is arranged to prime four combiner circuits 333, 334, 336 and 337. The capacitors in combiner circuits 333 and 334 are connected over conductor 338 to be pulsed when a discharge reaches the final cathode X of tube 402 in response to the code combination for the character X. These two combiner circuits, upon being pulsed, extend the pulse to conductors 327 and 329, thereby selecting both of the stations 513 and 516 to receive a message. In this way, a message may be routed to two or more stations in response to an address code jointly designating them. The other two combiner circuits that are primed by transistor 331 are not pulsed in response to the character X, because their capacitors have other connections. Specifically, combiner circuit 336 has its capacitor connected over conductor 339 extending to the resistive path that becomes conductive when a discharge transfers to final cathode A in tube 401, the combiner circuit 336 combining the codes G and A, and the capacitor associated with combiner circuit 337 is connected over conductor 341 to the resistive path associated with final cathode J in the same stepping tube, combiner circuit 337 combining the codes G and J.

The last of the address codes is followed by the carriage return and line feed signals which are effective, in the teletypewriters that have been selected to receive the message, to advance the stationery in the teletypewriter to the point of beginning of a new line for the recording of the message to follow. There is no connection to the resistor path associated with final cathode CR of stepping tube 201, to which a discharge is transferred in response to the carriage return signal. There is a connection, however, to the final cathode LF in stepping tube 202, and this connection extends over conductor 227, capacitor 342, and resistor 343 to the left-hand grid of tube V8. This tube has connections establishing a bi-stable flip-flop circuit. The tube V8, together with the tube V9, comprises an activate-deactivate circuit by means of which the first line feed signal, received following the selection of stations in response to address codes, deactivates the station selector mechanism so that stations cannot be selected in response to character sequences appearing in the text of a message that correspond to the address codes of those stations. The end-of-message signal is subsequently effective upon the circuit comprising tubes V8 and V9 to activate the station selector circuit so that it will effect selections of stations in response to address codes. In the activate condition, the left-hand triode of tube V8 is conducting, and the right-hand triode is cut off. This causes the positive potential of non-conductive right-hand anode of tube V8 to be applied over conductors 344 and 346 to the screen grids of tubes V7A and V7B. Earlier in this description it was assumed that these tubes had proper screen voltage for their operation, that screen voltage obtained from tube V8. Since the left-hand triode of tube V8 is conducting, the positive pulse applied to its grid from final cathode LF of tube 202 when a discharge is transferred to that cathode, has no effect on tube V8. When the discharge is reset in tube 202 about the middle of the start element of the next receiving code combination, a negative pulse is applied over conductor 227 and through capacitor 342 to cut off the left-hand triode of tube V8. The flip-flop connections cause the right-hand triode to become conductive and the anode swings toward negative, removing the positive screen voltage from tubes V7A and V7B and thereby rendering those tubes insensitive to control by their control grids. During reception of the message, the stepping tubes continue to decode received code combinations, stepping discharges to their final cathodes selectively, triggering associated single transistor flip-flop circuits, and pulsing tubes V7A and V7B and corresponding tubes when sequences of two code combinations correspond to address codes in response to which those tubes are to be pulsed. The pulsing of the control grids of the tubes is ineffective because of removal of the screen voltage, and those unselected stations cannot be inadvertently selected.

Each time that a Figures code combination is received, a single transistor flip-flop circuit including transistor 347 is triggered, during the start element of the next code combination, by a negative pulse impressed through capacitor 348 from conductor 349 which is connected to the final cathode Figs. in tube 401. This single transistor flip-flop circuit, upon being triggered, primes a code combiner circuit comprising resistor 351 and capacitor 352 associated with the grid of tube V9, and capacitor 352 is connected over conductor 353 to the final cathode H of tube 201. The only circumstance under which the H code combination properly follows the Figures code combination is the end-of-message or disconnect signal. Accordingly, any occurrence of the Figures signal in the text of the message will merely result in the priming of the combiner circuit associated with the grid of tube V9, and in response to the next succeeding code combination, transistor 347 will be restored. However, when the H signal follows the Figures signal, the positive pulse applied from the final cathode H of tube 201 through capacitor 352, which is charged from off-normal transistor circuit 347, will render tube V9 conductive momentarily. Its anode, which is connected through capacitor 340 and resistor 350 to the right-hand grid of tube V8, will swing negative momentarily, cutting off the right-hand triode of tube V8 and restoring conductivity to the left-hand triode. With the right-hand triode cut off, the screen voltage will be restored to tubes V7A and V7B and corresponding tubes, thereby effecting reactivation of the station selecting circuits.

The circuit arrangement in the upper left-hand portion of Fig. 3 provides for the selection of one teletypewriter station to receive a message when an address code preceding that message is faulty and, accordingly, nonvalid to select any station associated with the transmission channel. It will be understood that a multistation line may include several selector mechanisms of the type being described herein, each serving a plurality of teletypewriter stations. If a message is transmitted from station 101, preceded by an address code which does not represent any station associated with transmission channel 106, none of the teletypewriter stations associated with the line will be selected in specific response to that address code, and the message would be lost in the absence of the circuit arrangement in the upper left-hand portion of Fig. 3. In order to preclude the possibility of such loss of message, the circuit arrangement is provided and is arranged to route any message that is preceded by a non-valid code to station 513. Upon receipt of the message at that station, an investigation may be made as to the proper addressee of the message, and steps may be taken to have the message retransmitted so that it will reach the proper destination.

The circuit arrangement for accomplishing this operates upon the principle that it seeks to select station 513 in response to every address code received by relay 107. This attempt is nullified if the address code represents station 513 or 516, or any other station selectable by the selector mechanism shown in Figs. 1 to 4, and the attempt is also nullified if the address code represents a station selectable by any other selector mechanism associated with the same transmission channel 106.

The non-valid code recognizing circuit comprises twin triode tube V10, pentode tube V11 and a transistor 354. Twin triode tube V10 has circuit connections establishing a bistable flip-flop circuit, not with symmetrical cross-connections from anodes to grids, as in the case of tubes V5A and V5B, but with a cross connection from the right-hand anode to the left-hand grid, and a common cathode resistor providing feedback whereby two conditions of stability are possible. Tube V10 is normally conductive in the left-hand triode and tube V11 is normally cut off. Each time the reset triode, which is the right-hand triode of tube V4, is pulsed negatively by the character timer twin triode V1 about the middle of the fifth selecting element of each received code combination, the negative pulse being applied over conductors 144 and 146, a negative pulse is also applied from conductor 144 over conductor 152 and capacitor 356 to the left-hand grid of tube V10, seeking to cut off that triode. The left-hand triode of tube V10 cuts off and seeks to render the right-hand triode conductive via the common cathode resistor. There is a connection from the right-hand anode of tube V8 in the activate-deactivate circuit over conductor 344 and conductor 357 to the right-hand grid of tube V10. It will be remembered that when the deactivate condition exists, under which station receiving circuits are not to be responsive to sequences of code combinations corresponding to address codes, the right-hand triode of tube V8 is conductive and its anode is negative. This negative potential applied to the right-hand grid of tube V10 prevents the transfer of conductivity from the left-hand triode to the right-hand triode of that tube. Accordingly, when the negative pulse through capacitor 356 has been dissipated, the left-hand triode is restored to conductivity since the right-hand triode has not been rendered conductive, and will not hold the left-hand triode cut off. When the tube V8 becomes reversed for the activate condition, with the right-hand triode cut off, the anode is swung toward positive, making the right-hand grid of tube V10 less negative than it is in the deactivate condition, but still sufficiently negative that the right-hand triode of tube V10 will not be rendered conductive except upon the cutting off of the left-hand triode of that tube.

It will be assumed that the activate-deactivate circuit has just been placed in the activate condition in response to the Figures H code combination of the end-of-message signal, thereby removing the disabling potential on the right-hand grid of tube V10. The signal that normally follows the H signal is a Letters signal. About the middle of the fifth selecting element of that signal, the character timer circuit restores and applies a negative pulse through condenser 356 to the left-hand grid of tube V10, seeking to cut off the left-hand triode of that tube. At substantially the same time the discharge in tube 401 transfers to the final cathode LTRS swinging toward positive the junction of resistors 414 and 416, from which conductor 417 extends to one terminal of capacitor 358. The other terminal of the capacitor is connected over conductors 359 and 361 to the control grid of tube V11. A positive pulse is thus applied through capacitor 358 to the grid of tube V11, rendering that tube conductive momentarily. The anode of tube V11, which swings negative as the tube conducts, is connected through crystal diode 362 and capacitor 363 to the right-hand grid of tube V10. Diode 362 is so connected as to pass negative excursions of the anode of tube V11 and to block positive excursions. The negative swing of the anode of tube V11 is thus impressed upon the right-hand grid of tube V10 and precludes the activation of the right-hand triode of tube V10 while the left-hand triode is cut off. When the negative pulse applied through capacitor 356 to the left-hand grid has been dissipated, the left-hand triode returns to conductivity. Thus tube V10 cannot be reversed in response to any received Letters signal because the negative pulse applied to the right-hand grid dominates the tube.

It will now be assumed that the code combination BR for selecting teletypewriter station 513 is received following the Letters signal. The operations resulting from reception of this code combination have been fully described, and they include the momentary positive pulsing of the control grid of tube V7A from the combiner circuit comprising resistor 318 and capacitor 319. As the anode of tube V7A swings negative, it applies a negative pulse through crystal diode 517, conductors 518 and 519 and capacitor 363 to the right-hand grid of tube V10. This occurs in response to the signal for the character R of the address code BR. At the time of reception of the code combination for the character B, there is no disabling pulse applied to the right-hand grid of tube V10, because the right-hand triode of tube V10 can be disabled only through conductor 357, 519 or diode 362. Accordingly, when capacitor 356 is pulsed negatively at the middle of the fifth selecting element of the code combination for the character B, the left-hand triode of tube V10 cuts off and renders the right-hand triode conductive. This registers the reception of a code combination other than the Letters signal. With the left-hand triode of tube V10 cut off, the anode swings toward positive, but the swing is retarded somewhat by capacitor 364 connected to the left-hand anode. The anode load circuit for the left-hand triode of tube V10 includes resistors 366 and 367. From the junction of these two resistors there is a connection to the anode of a crystal diode 368, the cathode of which is connected to conductor 369 and through resistor 371 to positive battery. Before the cutting off of the left-hand triode of tube V10, the anode of diode 368 is negative relative to the cathode, thereby to bias the diode against transmission of positive pulses not exceeding the amount of the bias.

A source of positive pulses to be impressed through diode 368 on conductor 369 is comprised of delayed pulse amplifier transistor 354 which has its collector electrode connected through capacitor 373 to the anode of diode 368, its emitter electrode connected through crystal diode 374 and conductor 376 to the junction of conductors 316 and 317, and its base electrode connected through resistor 377 to ground. It will be remembered that conductors 317 and 316 are included in a path from the right-hand cathode of the tube V4, the grid of which is pulsed negatively from the character timer tube V1 about the middle of the fifth selecting element of a received code combination, capacitor 151 delaying the pulse. The purpose of the pulse applied over conductors 317 and 316 is to reset the transistor flip-flop circuits. The negative-going reset pulse also cuts off diode 374. Transistor 354, which is normally conducting, then charges capacitor 374B negatively. Transistor 354 then cuts itself off, since there is no further source of emitter current. After cutting off, the base voltage of transistor 354 is quickly drawn toward ground by resistor 377. Transistor 354 cannot refire until capacitor 374B is charged positively by resistors 374C and 374D so that the emitter is again more positive than the base. The amount of time required by the emitter circuit to refire is longer than the duration of the original negative reset pulse on conductors 317 and 376. The timing of this emitter circuit is also chosen to be shorter than the timing wave of capacitor 364 when tube V10 left cuts off, but longer than the timing wave on the capacitor when tube V10 left conducts. It will be apparent from this that the anode of diode 368 is pulsed positively from transistor 354 some time after the middle of the fifth selecting element of each received code combination, the delay being introduced partly by capacitor 151 associated with the right-hand grid of tube V4 and also by the delay of the emitter circuit of transistor 354. It follows that the pulsing of the anode of diode 368 occurs a short time after the cutting off of the left-hand triode of tube V10 incident to reception of the code combination for the character B of the address code BR. Since capacitor 364 associated with the left-hand anode of tube V10 delays the enablement of diode 368, that capacitor is of sufficient size to delay the enablement of the diode until after the positive pulse through capacitor 373 has been dissipated. The next pulsing of the anode of diode 368 by transistor 354 occurs a little after the middle of the fifth selecting element of the code combination for the character R. Before the occurrence of that pulse, the right-hand grid of tube V10 has been pulsed negatively by recognition of the proper code "BR," over conductor 519 and capacitor 363 to cut off the right-hand triode of tube V10 and restore conductivity in the left-hand triode. Capacitor 364 associated with the left-hand anode of tube V10, having slowly charged through resistors 366 and 367 to enable diode 368, quickly discharges through the much lower impedance of the left-hand triode of tube V10, thereby restoring a blocking potential on the anode of diode 368 before the pulsing of transistor 354 and the application of a positive pulse to the anode of diode 368 through capacitor 373. Thus, neither a first code character of any sort, nor a second character which completes a valid two-letter code, will allow a pulse through diode 368. If, however, tube V10 has not been reset by the second character of a valid code, capacitor 364 will remain positively charged so that diode 368 is in the enabled condition at the time of occurrence of the transistor pulse. The pulse generated by transistor 354 is then applied through diode 368, conductor 369, resistor 521 and capacitor 522 to the control grid of tube V7A. Thus, that pulse, when permitted to pass, will have the same effect upon tube V7A as a positive pulse impressed on the grid from the combiner circuit comprising resistor 318 and capacitor 319, namely to place the station 513 in message receptive condition.

From the junction of conductors 518 and 519, conductor 523 extends to the anode of tube V7B, so that if the station 516 should have been selected, it will preclude the selection of station 513 in response to the successful passage of a positive pulse through diode 368 to the control grid of tube V7A. All receiving station selector circuits controlled by the selector system in Figs. 1 to 4 would have connection to conductor 519 to similarly preclude selection of station 513 if any one of the other stations controlled by the same selector mechanism is selected.

Referring to Fig. 3, it will be noted that combiner circuits 336 and 337, which are found to be responsive to address codes GA and GJ have their outputs connected to a conductor 378. Other combiner circuits that are also connected to that conductor are combiner circuit 379 which responds to address code QW, combiner circuit 381 which responds to address code CD, and combiner circuit 382 which responds to address code CC. Conductor 378 is connected over conductor 383 to conductor 361 and thence to the control grid of tube V11. The address codes that result in the effective operation of those combiner circuits are the codes of stations selectable by other selector mechanisms associated with the same transmission channel or line. The effect of the pulsing of the capacitor in any one of those combiner circuits is the same as the effect of the pulsing through capacitor 358 in response to the Letters signal, namely the momentary activation of tube V11 and a swing of its anode toward negative and return. As previously described, the diode 362 will pass the negative pulse and impress it on capacitor 363. The pulsing of that condenser from diode 362 will have the same effect on tube V10 as the pulsing of that condenser from conductor 519, namely the cutting off of the right-hand triode of tube V10 and the reactivation of the left-hand triode to prevent the selection of station 513 under the control of the pulse subsequently impressed upon capacitor 373 by transistor 354. It follows from this that when a two-character code is received when the selector is in the activate condition and that code does not correspond to the address code of any station served by the selector mechanism, and no receiving station served by that selector has been rendered receptive by one of its own selecting codes, and the two-character code does not correspond to the address code of any station served by any other selector mechanism associated with the same line, the station 513 will be selected to receive the message. In this way, all misdirected messages are routed to a single station where the operating personnel will undertake to ascertain the proper destination of the message and attend to the retransmission of the message with the proper address code. Accordingly, only one of the selector mechanisms associated with a multistation line need be provided with a non-valid code recognizing circuit comprising tubes V10 and V11, transistor 354, and circuit components associated with them.

Although a specific embodiment of the invention has been shown in the drawings and described in the foregoing specification, it will be understood that the invention is not limited to the specific embodiments but is capable of modification, substitution and rearrangement of parts and elements without departing from the spirit of the invention.

What is claimed is:

1. A teletypewriter switching system having a station selector circuit for selectively placing stations in message receiving condition including permutation code signal receiving means, a discharge tube having a fan-like array of electrdoes of one kind including an electrode representing an apex of said fan-like array and ranks of electrodes progressively doubling in number in a direction outwardly from said apex electrode, connections from said permutation code signal receiving means to said electrodes for causing selective transfer of a discharge in said tube beginning at said apex electrode and proceeding from rank to rank and to a selected one of the electrodes in each rank according to the successive elements of a permutation code signal combination, storage circuits connected to the electrodes in the outermost rank to be activated upon the transfer of the discharge to an electrode in said rank, a combiner circuit individual to each of said storage circuits and having one connection thereto and another connection to an electrode in said outermost rank, and station activating means operable by said combiner circuits for placing said stations in message receiving condition.

2. A telegraph station selector system having a code signal receiving circuit, normally dormant means for generating timing impulses having predetermined intervallic relation to received signal elements of code signals, means responsive to the reception of the beginning of a code signal by said receiving circuit for activating said normally dormant impulse generating means, electron discharge means having a plurality of output electrodes and means for selectively stepping a discharge through a plurality of steps to any one of said output electrodes, means controlled jointly by said signal receiving circuit and said impulse generating means for controlling said discharge stepping means, flip-flop means having two conditions of stability and connected to said output electrodes to be driven to the off-normal condition of stability upon the selective stepping of the discharge to the associated output electrodes, means controlled jointly by each of said flip-flop means and said output electrodes for combinationally registering successive reception of two code signals, at least one telegraph station, and means controlled by said registering means for selectively connecting said telegraph station receptively with said signal receiving circuit.

3. A telegraph station selector system having a code signal receiving circuit, normally dormant means for generating timing impulses having predetermined intervallic relation to received signal elements of code signals, means responsive to the reception of the beginning of a code signal by said receiving circuit for activating said normally dormant impulse generating means, electron discharge means having a plurality of output electrodes and means for selectively stepping a discharge through a plurality of steps to any one of said output electrodes, means controlled jointly by said signal receiving circuit and said impulse generating means for controlling said discharge stepping means, means controlled by said output electrodes for registering the advancement of a discharge thereto, means controlled jointly by said registering means and said output electrodes for combinationally registering successive reception of two code signals, at least one telegraph station, and means controlled by said last-mentioned registering means for selectively connecting said telegraph station receptively with said signal receiving circuit.

4. A telegraph station selector system having a code signal receiving circuit, normally dormant means for generating timing impulses having predetermined intervallic relation to received signal elements of code signals, means responsive to the reception of the beginning of a code signal by said receiving circuit for activating said normally dormant impulse generating means, electron discharge means having a plurality of output electrodes and means for selectively stepping a discharge through a plurality of steps to any one of said output electrodes, means controlled jointly by said signal receiving circuit and said impulse generating means for controlling said discharge stepping means, flip-flop means having normal and off-normal conditions of stability and connected to said output electrodes to be driven to the off-normal condition upon the stepping of the discharge to associated output electrodes, at least one gate circuit connected to each of said flip-flop means and caused to approach gating condition only by off-normal condition of the flip-flop means, a pulsing connection between each of said gate circuits and one of said output electrodes, and pulse operable means connected to each of said gate circuits for operation by pulses gated through their respective gate circuits from said output electrodes.

5. A system in accordance with claim 4 wherein there is additionally provided; a self-restoring flip-flop circuit having normal and off-normal conditions of stability operably connected to said code receiving circuit and adapted to be driven to the off-normal condition in response to the beginning of a code signal, a normally conductive electron discharge device operably connected to said self-restoring flip-flop circuit and adapted to be conductively suppressed by the restoration of said self-restoring flip-flop circuit to the normal condition of stability, and a control connection including a delay circuit between said normally conductive electron discharge device and said flip-flop means for restoring said flip-flop means to the normal condition of stability a predetermined time after conduction is suppressed in said normally conductive electron discharge device.

6. A telegraph station selective system having a transmission channel, a code signal receiving circuit, a decoding circuit operably associated with said receiving circuit having a plurality of output electrodes and adapted to apply a pulse to a particular one of said electrodes in response to reception of a particular code signal by said receiving circuit, a self-restoring flip-flop circuit having normal and off-normal conditions of stability, means responsive to the reception of the beginning of a code signal by said receiving circuit for driving said self-restoring flip-flop circuit to the off-normal condition, a bistable flip-flop circuit having normal and off-normal conditions of stability, a control connection between said self-restoring and said bistable flip-flop circuits to drive said bistable flip-flop circuit to the off-normal condition when said self-restoring flip-flop circuit is restored to the normal condition, a normal nonconductive electron discharge device having connection to a predetermined electrode of said decoded circuit and adapted to be rendered conductive by a pulse applied to said predetermined electrode, a second control connection between said normally nonconductive device and said bistable flip-flop circuit to preclude said bistable flip-flop circuit from going off normal when said normally nonconductive device is rendered conductive.

7. A system in accordance with claim 6 in which there is additionally provided station activating means having connection to a certain two of said decoding circuit electrodes and adapted to be activated by pulses applied to said two certain electrodes, a third control connection between said bistable flip-flop circuit and said station activating means to prevent said bistable flip-flop circuit from going off normal when said station activating means is activated.

8. A system in accordance with claim 7 in which there is additionally provided monitor station activating means, a fourth control connection including a delay circuit between said bistable flip-flop circuit and said monitor station activating means to activate said monitor station when said bistable flip-flop circuit is driven off normal for a predetermined period.

9. A telegraph station selector circuit for connecting a teletypewriter with a transmission line, said selector circuit comprising a decoding circuit having a plurality of output terminals and adapted to selectively apply a pulse to one of said terminals in response to the reception of a code signal from said line, a self-restoring flip-flop circuit having a stable and an unstable condition, means responsive to the beginning of a received code signal for driving said self-restoring circuit to said unstable condition, a plurality of storage circuits for individually storing an indication in response to a pulse applied to an associated decoding circuit terminal, a combiner circuit responsive to said stored indication for gating therethrough a pulse from one of said decoding circuit terminals, an activating circuit operable in response to said gated pulse for connecting said teletypewriter with said line, a bistable flip-flop circuit having normal and off-normal conditions of stability and adapted to be driven to said off-normal condition in response to the restoration of said self-restoring circuit to said stable condition, means responsive to gated pulses for restoring said bistable flip-flop circuit to said normal condition and means jointly responsive to said off-normal condition bistable flip-flop and the restoration of said self-restoring circuit to said stable condition for operating said activating circuit.

10. In a recognition circuit for decoding received permutation code signals, a decoding circuit having a plurality of output terminals, means in said decoding circuit for selectively applying a pulse to one of said terminals in response to a received code signal, a self-restoring flip-flop circuit operated to the unstable condition in response to the beginning of received code signals, a bistable flip-flop circuit having a normal and an off-normal condition of stability and operated to said off-normal condition in response to the restoration of said self-restoring circuit to the stable condition, means responsive to the application of pulses to said terminals for restoring said bistable circuit to said normal condition, a gate circuit, delay means responsive to said off-normal condition bistable circuit for forward biasing said gate circuit and pulse generating means responsive to the restoration of said self-restoring circuit for passing a pulse through said forward biased gate circuit.

11. A telegraph station selector circuit for connecting a teletypewriter with a transmission line, said circuit comprising an electron discharge device having a plurality of output electrodes, means in said selector circuit responsive to the reception of a predetermined code signal from said line for selectively stepping a discharge through a plurality of steps to a predetermined output electrode, means controlled by said output electrodes for registering the advancement of a discharge thereto, means controlled by said registration for gating a discharge of one of said output electrodes therethrough, an activating circuit operable in response to said gated discharge for connecting said teletypewriter to said line and means controlled by the discharge of other ones of said output electrodes for precluding the operation of said activating circuit.

References Cited in the file of this patent

UNITED STATES PATENTS

| | | |
|---|---|---|
| 2,606,309 | Townsend | Aug. 5, 1952 |
| 2,844,811 | Burkhart | July 22, 1958 |

FOREIGN PATENTS

| | | |
|---|---|---|
| 197,503 | Great Britain | May 17, 1923 |